(12) United States Patent
Komori et al.

(10) Patent No.: US 12,258,034 B2
(45) Date of Patent: Mar. 25, 2025

(54) CONTROL DEVICE

(71) Applicant: HONDA MOTOR CO., LTD., Tokyo (JP)

(72) Inventors: Yuichi Komori, Saitama (JP); Shohei Noai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 18/128,105

(22) Filed: Mar. 29, 2023

(65) Prior Publication Data
US 2023/0311919 A1    Oct. 5, 2023

(30) Foreign Application Priority Data

Mar. 30, 2022 (JP) ................................ 2022-057496

(51) Int. Cl.
| | |
|---|---|
| *B60W 50/14* | (2020.01) |
| *B60W 40/072* | (2012.01) |
| *B60W 40/08* | (2012.01) |
| *G06V 20/56* | (2022.01) |
| *G06V 20/59* | (2022.01) |

(52) U.S. Cl.
CPC .......... *B60W 50/14* (2013.01); *B60W 40/072* (2013.01); *B60W 40/08* (2013.01); *G06V 20/588* (2022.01); *G06V 20/597* (2022.01); *B60W 2050/143* (2013.01); *B60W 2050/146* (2013.01); *B60W 2420/403* (2013.01)

(58) Field of Classification Search
CPC .... B60W 50/14; B60W 40/072; B60W 40/08; B60W 2050/143; B60W 2050/146; B60W 2420/403; G06V 20/597; G06V 20/588

USPC ....................................................... 340/425.5
See application file for complete search history.

(56) References Cited

U.S. PATENT DOCUMENTS

| | | | | |
|---|---|---|---|---|
| 10,120,380 | B2 * | 11/2018 | Otaki ..................... | B60W 50/16 |
| 10,227,039 | B1 * | 3/2019 | Prasad .................. | B60W 50/14 |
| 10,703,364 | B2 * | 7/2020 | Irie ........................ | B60W 50/14 |
| 2015/0307094 | A1 * | 10/2015 | Ito ......................... | B62D 15/025 |
| | | | | 701/1 |
| 2016/0288707 | A1 * | 10/2016 | Matsumura ........... | B60W 50/14 |
| 2017/0028995 | A1 * | 2/2017 | Mori ................. | B60W 60/0053 |
| 2017/0315556 | A1 * | 11/2017 | Mimura ............... | G05D 1/0061 |

(Continued)

FOREIGN PATENT DOCUMENTS

JP    2015-210680 A    11/2015

*Primary Examiner* — Zhen Y Wu
(74) *Attorney, Agent, or Firm* — Paratus Law Group, PLLC

(57) ABSTRACT

A control device for controlling a host vehicle includes processing circuitry configured to: recognize partition lines marking off left and right sides of a travel path on which the host vehicle travels; estimate a possibility of the host vehicle to depart from the travel path based on a position and a posture of the host vehicle with respect to the recognized partition lines; and control the notification based on the estimated possibility of departing from the travel path, the driving status information, and a state of the travel path in a traveling direction of the host vehicle. The processing circuitry executes the notification when there is a curve with a curvature radius less than a predetermined value in the traveling direction, and there is a high possibility of departing from the travel path, and the driving status of the driver is not suitable for traveling on the travel path.

9 Claims, 10 Drawing Sheets

(56) References Cited

U.S. PATENT DOCUMENTS

| | | | |
|---|---|---|---|
| 2018/0037230 A1* | 2/2018 | Otake | B60K 28/06 |
| 2018/0150074 A1* | 5/2018 | Hashimoto | B60W 60/0053 |
| 2019/0047585 A1* | 2/2019 | Kagerer | B60W 30/17 |
| 2019/0193731 A1* | 6/2019 | Irie | B60W 50/14 |
| 2020/0047746 A1* | 2/2020 | Ji | B60W 10/18 |
| 2020/0047772 A1* | 2/2020 | Yasue | B60W 30/16 |
| 2020/0184821 A1* | 6/2020 | Yamaoka | B60W 10/20 |
| 2020/0285233 A1* | 9/2020 | Hafner | B60W 30/12 |
| 2020/0377082 A1* | 12/2020 | Nassouri | B60W 30/0956 |
| 2021/0221362 A1* | 7/2021 | Matsumura | B60W 30/143 |
| 2023/0071612 A1* | 3/2023 | Takeuchi | B60W 40/072 |
| 2023/0211786 A1* | 7/2023 | Peyret | B60W 40/10 701/36 |

* cited by examiner

FIG. 4

| DRIVING STATUS NON-MATCHING FLAG | BLINKER OPERATION | VIEWING DIRECTION | PRESENCE OR ABSENCE OF TOUCHING WITH STEERING | PRESENCE OR ABSENCE OF STEERING TORQUE/STEERING ANGLE | |
|---|---|---|---|---|---|
| SET TO OFF STATE | PRESENCE | IGNORE | IGNORE | IGNORE | TL_a |
| SET TO OFF STATE | ABSENCE | WITHIN ALLOWABLE RANGE | PRESENCE | PRESENCE | TL_b |
| SET TO ON STATE | ABSENCE | OUT OF ALLOWABLE RANGE | PRESENCE | PRESENCE | TL_c |
| SET TO OFF STATE | ABSENCE | WITHIN ALLOWABLE RANGE | ABSENCE | PRESENCE | TL_d |
| SET TO ON STATE | ABSENCE | OUT OF ALLOWABLE RANGE | ABSENCE | PRESENCE | TL_e |
| SET TO ON STATE | ABSENCE | WITHIN ALLOWABLE RANGE | PRESENCE | ABSENCE | TL_f |
| SET TO ON STATE | ABSENCE | OUT OF ALLOWABLE RANGE | PRESENCE | ABSENCE | TL_g |
| SET TO ON STATE | ABSENCE | WITHIN ALLOWABLE RANGE | ABSENCE | ABSENCE | TL_h |
| SET TO ON STATE | ABSENCE | OUT OF ALLOWABLE RANGE | ABSENCE | ABSENCE | TL_i |

TL / DRIVING STATUS (FIG. 7 Continued)

FIG. 8

| DRIVING STATUS NON-MATCHING FLAG | DRIVING STATUS | | | | |
|---|---|---|---|---|---|
| | BLINKER OPERATION | VIEWING DIRECTION | PRESENCE OR ABSENCE OF TOUCHING WITH STEERING | PRESENCE OR ABSENCE OF STEERING TORQUE/STEERING ANGLE | |
| SET TO OFF STATE | PRESENCE | IGNORE | IGNORE | IGNORE | TL_a |
| SET TO OFF STATE | ABSENCE | WITHIN ALLOWABLE RANGE | PRESENCE | PRESENCE | TL_b |
| SET TO OFF STATE | ABSENCE | OUT OF ALLOWABLE RANGE | PRESENCE | PRESENCE | TL_c |
| SET TO OFF STATE | ABSENCE | WITHIN ALLOWABLE RANGE | ABSENCE | PRESENCE | TL_d |
| SET TO OFF STATE | ABSENCE | OUT OF ALLOWABLE RANGE | ABSENCE | PRESENCE | TL_e |
| SET TO ON STATE | ABSENCE | WITHIN ALLOWABLE RANGE | PRESENCE | ABSENCE | TL_f |
| SET TO ON STATE | ABSENCE | OUT OF ALLOWABLE RANGE | PRESENCE | ABSENCE | TL_g |
| SET TO OFF STATE | ABSENCE | WITHIN ALLOWABLE RANGE | ABSENCE | ABSENCE | TL_h |
| SET TO ON STATE | ABSENCE | OUT OF ALLOWABLE RANGE | ABSENCE | ABSENCE | TL_i |

TL

CONTROL DEVICE

CROSS-REFERENCE TO RELATED APPLICATIONS

This application is based on and claims priority under 35 USC 119 from Japanese Patent Application No. 2022-0574% filed on Mar. 30, 2022, the entire content of which is incorporated herein by reference.

TECHNICAL FIELD

The present invention relates to a control device that controls a vehicle.

BACKGROUND ART

In recent years, efforts are made to provide access to a sustainable transportation system that considers vulnerable traffic participants. As one of these efforts, research and development on driving assistance techniques and automatic driving techniques for vehicles such as automobiles are conducted to further improve safety and convenience of traffic. As an example of the driving assistance techniques, road departure mitigation (RDM) for mitigating a vehicle from departing from a travel path is proposed.

JP2015-210680A below discloses a technique of executing at least one of departure avoidance control for avoiding departure from the travel path at least by steering, and warning output control when n times (here, n is a natural number greater than 1) are counted as the number of departure from the travel path within a predetermined time.

In the related art, even when a driver intentionally moves the vehicle off the travel path (hereinafter also referred to as "off the road") such as entering a shop on a roadside or pulling over to a road shoulder, the RDM may be activated and an alarm or the like may be output, and the driver may feel annoyed by such excessive RDM activation.

An aspect of the present disclosure relates to provide a control device capable of reducing excessive notification that may annoy the driver.

SUMMARY OF INVENTION

According to an aspect of the present disclosure, there is provided a control device for controlling a host vehicle, the host vehicle including an external sensor configured to acquire surrounding information of a host vehicle, a driving status sensor configured to acquire driving status information indicating a driving status of a driver of the host vehicle, and a notification device capable of executing notification to the driver. The control device includes processing circuitry configured to: recognize partition lines based on the surrounding information acquired by the external sensor, the partition lines marking off left and right sides of a travel path on which the host vehicle travels; estimate a possibility of the host vehicle to depart from the travel path based on a position and a posture of the host vehicle with respect to the recognized partition lines; and control the notification by the notification device based on the estimated possibility of departing from the travel path, the driving status information acquired by the driving status sensor, and a state of the travel path in a traveling direction of the host vehicle. The processing circuitry executes the notification when there is a curve with a curvature radius less than a predetermined value in the traveling direction, and there is a high possibility of departing from the travel path, and the driving status of the driver is not suitable for traveling on the travel path.

BRIEF DESCRIPTION OF DRAWINGS

FIG. 4 is a diagram showing an example of a driving status determination table;

DESCRIPTION OF EMBODIMENTS

An embodiment of a control device according to the present invention will be described below with reference to the drawings. Note that in the following description, the same or similar elements are denoted by the same or similar reference signs, and the description thereof may be omitted or simplified as appropriate.

[Vehicle]

Figure 1:
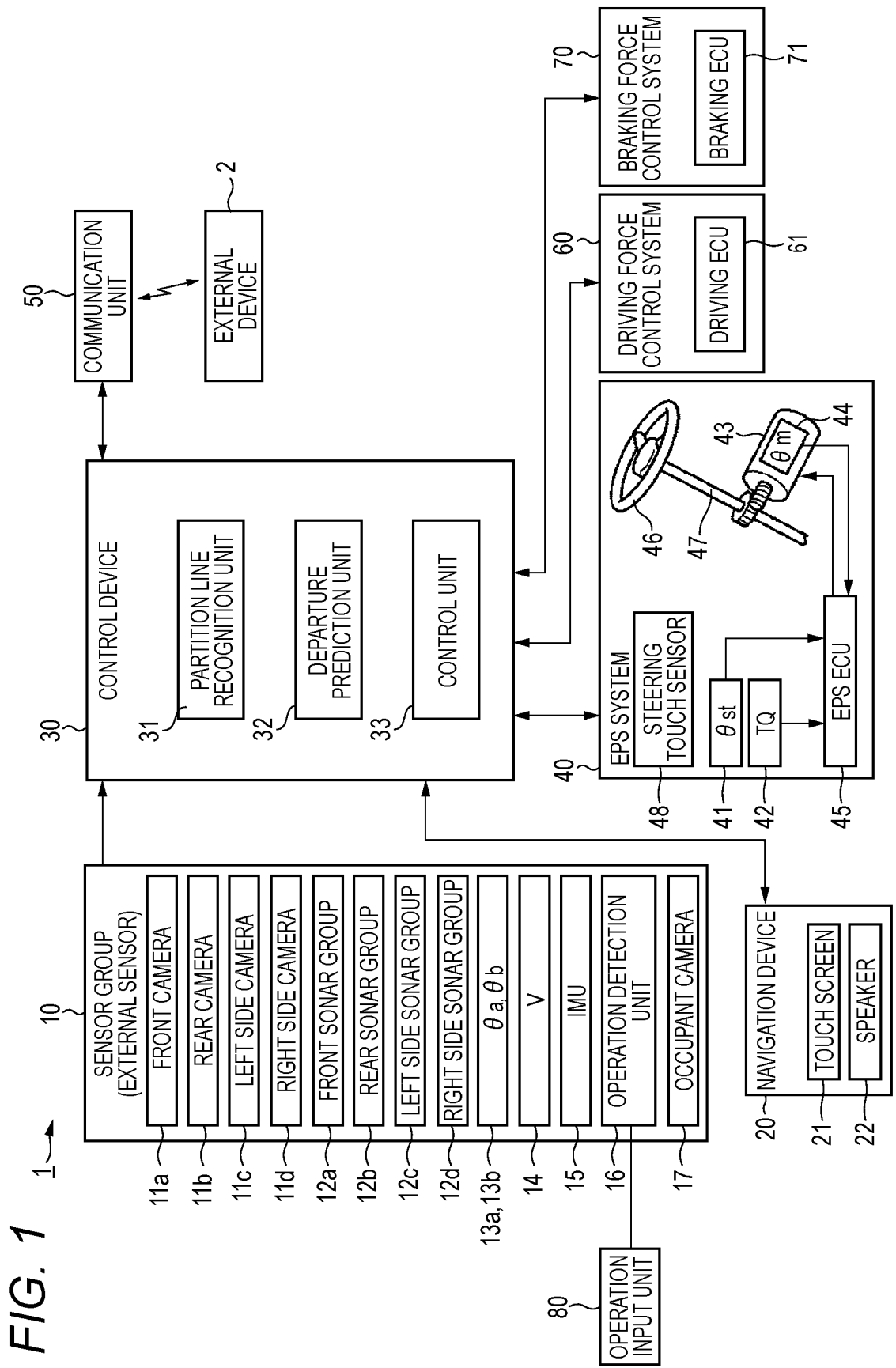
FIG. 1 is a block diagram showing a schematic configuration of a vehicle according to one embodiment.

A vehicle 1 (hereinafter also referred to as "host vehicle") according to the present embodiment shown in FIG. 1 is an automobile that includes a drive source, and wheels including drive wheels driven by power of the drive source and steerable steering wheels (both not shown). For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of the electric motor and the internal combustion engine. The drive source of the vehicle 1 may drive the pair of left and right front wheels, the pair of left and right rear wheels, or the four wheels including the pair of left and right front wheels and the pair of left and right rear wheels. The front wheels or the rear wheels may be steering wheels that are steerable, or the front wheels and the rear wheels may both be steering wheels that are steerable.

As shown in FIG. 1, the vehicle 1 includes a sensor group 10, a navigation device 20, a control device 30 which is an example of a control device according to the present invention, an electric power steering system (EPS system) 40, a communication unit 50, a driving force control system 60, a braking force control system 70, and an operation input unit 80.

The sensor group 10 acquires various detection values related to the vehicle 1 or surroundings of the vehicle 1. The detection values acquired by the sensor group 10 are used for controlling the vehicle 1 by the control device 30. The sensor group 10 includes a front camera 11a, a rear camera 11b, a left side camera 11c, a right side camera 11d, a front sonar group 12a, a rear sonar group 12b, a left side sonar group 12c, and a right side sonar group 12d. These cameras, sonar groups, radars, LIDARs, and the like can function as external sensors that acquire surrounding information of the vehicle 1.

The front camera 11a, the rear camera 11b, the left side camera 11c, and the right side camera 11d output image data of surrounding images acquired by capturing the surroundings of the vehicle 1 to the control device 30. The surrounding images captured by the front camera 11a, the rear camera 11b, the left side camera 11c, and the right side camera 11d are also called a front image, a rear image, a left side image, and a right side image, respectively. An image formed by the left side image and the right side image is also referred to as a side image.

The front sonar group 12a, the rear sonar group 12b, the left side sonar group 12c, and the right side sonar group 12d emit sound waves to the surroundings of the vehicle 1 and receive reflected sounds from other objects. The front sonar group 12a includes, for example, four sonars. The sonars that constitute the front sonar group 12a are provided at an obliquely left front side, a left front side, a right front side, and an obliquely right front side of the vehicle 1, respectively. The rear sonar group 12b includes, for example, four sonars. The sonars that constitute the rear sonar group 12b are provided at an obliquely left rear side, a left rear side, a right rear side, and an obliquely right rear side of the vehicle 1, respectively. The left side sonar group 12c includes, for example, two sonars. The sonars that constitute the left side sonar group 12c are provided on a front side of a left side of the vehicle 1 and a rear side of the left side of the vehicle 1. The right side sonar group 12d includes, for example, two sonars. The sonars that constitute the right side sonar group 12d are provided on a front side of a right side of the vehicle 1 and a rear side of the right side of the vehicle 1, respectively.

Furthermore, the sensor group 10 includes wheel sensors 13a and 13b, a vehicle speed sensor 14, an inertial measurement unit (IMU) 15, an operation detection unit 16, and an occupant camera 17. The wheel sensors 13a and 13b detect rotation angles of the wheels (not shown). The wheel sensors 13a and 13b may be implemented by angle sensors or may be implemented by displacement sensors. The wheel sensors 13a and 13b output detection pulses to the control device 30 each time the wheels rotate by a predetermined angle. The detection pulses output from the wheel sensors 13a and 13b can be used to calculate the rotation angles and rotation speeds of the wheels. A traveling distance of the vehicle 1 can be calculated based on the rotation angles of the wheels. The wheel sensor 13a detects, for example, a rotation angle θa of a left rear wheel. The wheel sensor 13b detects, for example, a rotation angle θb of a right rear wheel.

The vehicle speed sensor 14 detects a travel speed of the vehicle 1 (vehicle body), that is, a vehicle speed V, and outputs the detected vehicle speed V to the control device 30. The vehicle speed sensor 14 detects the vehicle speed V based on, for example, rotation of a countershaft of a transmission.

The inertial measurement device 15 detects angular velocities of the vehicle 1 in a pitch direction, a roll direction, and a yaw direction, and accelerations of the vehicle 1 in a front-rear direction, a left-right direction, and an upper-lower direction, and outputs these detection results to the control device 30. Note that an example in which the inertial measurement device 15 is provided is described in the present embodiment, but the present invention is not limited thereto. For example, merely an acceleration sensor that detects an acceleration of the vehicle 1 in a predetermined direction or a gyro sensor that detects an angular velocity of the vehicle 1 in a predetermined direction may be provided instead of the inertial measurement device 15.

The operation detection unit 16 detects an operation content performed by a user using the operation input unit 80 and outputs the detected operation content to the control device 30. The operation input unit 80 may include, for example, a blinker lever (not shown) that receives an operation to turn on a blinker as a direction indicator of the vehicle 1.

The occupant camera 17 outputs to the control device 30 image data obtained by, for example, capturing an image centering on a face of an occupant sitting in a driver seat of the vehicle 1 (that is, a driver). The occupant camera 17 is an example of a driving status sensor that acquires driving status information indicating a driving status of the driver, and specifically, can function as a driving status sensor for acquiring a viewing direction, which is a direction of the face or a visual line of the driver.

The navigation device 20 detects a current position of the vehicle 1 using a global positioning system (GPS) for example, and guides a user (for example, the driver, hereinafter simply referred to as "user") of the vehicle 1 on a route to a destination. The navigation device 20 includes a storage device (not shown) provided with a map information database.

A navigation device 20 includes a touch panel 21 and a speaker 22. The touch panel 21 functions as an input device that receives input of various kinds of information input to the control device 30 and a display device that is controlled by the control device 30. That is, the user can input various commands to the control device 30 via the touch panel 21. The touch panel 21 can display a screen for guiding and informing the user of various kinds of information. The speaker 22 outputs various kinds of information to the user by voice. That is, the touch panel 21 and the speaker 22 can function as notification devices capable of executing predetermined notification to the driver.

The control device 30 is mounted on the vehicle 1, is communicably connected to other devices mounted on the vehicle 1, and integrally controls the entire vehicle 1 by communicating with the other devices. The control device 30 is implemented by, for example, an ECU including a processor which performs various kinds of calculation, a storage device including a non-transitory storage medium which stores various kinds of information, and an input and output device which controls input and output of data between an inside and an outside of the control device 30. Note that the control device 30 may be implemented by one ECU or may be implemented by a plurality of ECUs.

Examples of the other devices connected to the control device 30 (hereinafter also simply referred to as "other devices") include each camera and sonar group and sensor included in the sensor group 10, an EPS electronic control unit (EPSECU) 45 of the EPS system 40, a driving ECU 61 of the driving force control system 60, and a braking ECU 71 of the braking force control system 70. Note that the EPSECU 45, the driving ECU 61, and the braking ECU 71 will be described later.

The control device 30 and the other devices are connected to each other via, for example, a wired communication network constituted by various wire harnesses, cables, connectors, and the like routed inside the vehicle 1. For example, a controller area network (CAN), a local interconnect network (LIN), Flex Ray, or a CAN with a flexible data rate (CANFD) can be adopted for the communication between the control device 30 and the other devices.

The control device 30 is configured to be capable of executing road departure mitigation control for mitigating the vehicle 1 departing from a travel path, which will be described later as an example of control relating to the vehicle 1. The road departure mitigation control includes notification control that notifies the driver that the vehicle 1 may depart from the travel path using a predetermined notification device, and steering assist control that assists steering so that the vehicle 1 does not depart from the travel path.

In the present embodiment, the notification indicating that the vehicle 1 may depart from the travel path is performed by displaying a predetermined warning image on the touch panel 21 and outputting a predetermined alarm sound from the speaker 22, but the present invention is not limited thereto. For example, in addition to the touch panel 21, a display device called a "multi-information display" may be provided in the vehicle 1, and the warning image may be displayed on the multi-information display to perform the notification.

The EPS system 40 includes a steering angle sensor 41, a torque sensor 42, an EPS motor 43, a resolver 44, the EPSECU 45, and a steering touch sensor 48.

The steering angle sensor 41, the torque sensor 42, and the steering touch sensor 48 can function as driving status sensors for acquiring operations from the driver on a steering 46. Specifically, the steering angle sensor 41, the torque sensor 42, and the steering touch sensor 48 detect (acquire) a steering angle $\theta st$ of the steering 46, a torque TQ applied to the steering 46, and whether the driver touches the steering 46, respectively, and output the detection results to the control device 30.

For example, during the steering assist control described above, the EPS motor 43 can assist a steering operation of the driver by applying a driving force or a reaction force to a steering column 47 coupled to the steering 46. The resolver 44 detects a rotation angle $\theta m$ of the EPS motor 43. The EPSECU 45 controls the entire EPS system 40.

The driving force control system 60 includes the driving ECU 61. The driving force control system 60 executes driving force control of the vehicle 1. For example, the driving ECU 61 controls a driving force of the vehicle 1 by controlling an engine (not shown) or the like in response to an operation of the driver on an accelerator pedal (not shown).

The braking force control system 70 includes the braking ECU 71. The braking force control system 70 executes braking force control of the vehicle 1. The braking ECU 71 controls a braking force of the vehicle 1 by controlling a brake mechanism (not shown) or the like in response to an operation by the driver on a brake pedal (not shown).

The communication unit 50 is a communication interface that communicates with an external device 2 provided outside the vehicle 1 under control of the control device 30. That is, the control device 30 can communicate with the external device 2 via the communication unit 50. For example, a mobile communication network such as a cellular line, Wi-Fi (registered trademark), or Bluetooth (registered trademark) can be adopted for the communication between the vehicle 1 and the external device 2. The external device 2 is managed, for example, by a manufacturer of the vehicle 1. The external device 2 may be a virtual server (cloud server) implemented in cloud computing service, or may be a physical server implemented as a single device.

[Control Device]

Next, an example of the control device 30 will be described in detail. As described above, the control device 30 is configured to be capable of executing the road departure mitigation control for mitigating the vehicle 1 departing from the travel path. For example, the control device 30 mitigates departure of the vehicle 1 from the travel path by executing the road departure mitigation control when the vehicle 1 approaches (for example, touches) partition lines (for example, white lines or yellow lines) that mark off left and right sides of the travel path on which the vehicle 1 travels. In this way, the departure of the vehicle 1 from the travel path is mitigated, and safety of the vehicle 1 can be improved.

On the other hand, if the road departure mitigation control is executed even when the driver intentionally moves the vehicle 1 off the path such as entering a shop on a roadside or pulling over to a road shoulder, the driver may feel annoyed by the road departure mitigation control. If such annoying road departure mitigation control continues, marketability of the vehicle 1 may decline, and the user may change to a setting so that the road departure mitigation control is not executed (in other words, a setting so that the road departure mitigation control is not utilized).

Therefore, the control device 30 executes the road departure mitigation control only when there is a curve in a traveling direction of the vehicle 1, and there is a high possibility that the vehicle 1 departs from the travel path, and a driving status of the driver is not suitable for traveling on the travel path of the vehicle 1. In this way, it is possible to prevent the road departure mitigation control from being executed for departure from the travel path that is relatively unlikely to lead to accidents, such as departure from the travel path intended by the driver, and it is possible to reduce excessive road departure mitigation control that may annoy the driver. On the other hand, the road departure mitigation control can be executed for departure that is likely to lead to accidents, such as departure from the travel path on a curve with poor visibility, so as to mitigate such departure and improve safety of the vehicle 1. Therefore, it is possible to reduce excessive road departure mitigation control while ensuring the safety of the vehicle 1.

Specifically, the control device 30 includes a partition line recognition unit 31, a departure prediction unit 32, and a control unit 33 as, for example, a functional unit implemented by a processor executing a program stored in a storage device of the control device 30 or a functional unit implemented by an input and output device of the control device 30.

The partition line recognition unit 31 has a function of recognizing partition lines (for example, white lines or yellow lines) that mark off the left and right sides of the travel path on which the vehicle 1 travels, based on surrounding information acquired by the sensor group 10. For example, the partition line recognition unit 31 can recognize the partition lines by image analysis of surrounding images obtained by the front camera 11*a*, the rear camera 11*b*, the left side camera 11*c*, and the right side camera 11*d*.

The departure prediction unit 32 has a function of estimating a possibility that the vehicle 1 departs from the travel path based on a position and a posture of the vehicle 1 with respect to the partition lines recognized by the partition line recognition unit 31. For example, the departure prediction unit 32 calculates a time to line crossing (TTLC), which is a time it takes the vehicle 1 to reach the partition line, as an index indicating the possibility that the vehicle 1 departs from the travel path. The smaller the value of TTLC, the closer the vehicle 1 is to the partition line (that is, the higher the possibility that the vehicle 1 departs from the travel path). Note that since a calculation method of TTLC is publicly known, detailed description thereof will be omitted here.

The control unit 33 has a function of executing the road departure mitigation control, based on the possibility of departing from the travel path estimated by the departure prediction unit 32, the driving status information acquired by the driving status sensor such as the occupant camera 17, and the state of the travel path in the traveling direction of the vehicle 1.

In the present embodiment, the driving status information includes information indicating the operation on the blinker lever, the viewing direction of the driver, the touching with the steering 46, the steering angle θst of the steering 46, and the torque TQ applied to the steering 46. Note that the driving status information does not necessarily include all of the above information. That is, the driving status information may be any information that allows the control device 30 (control unit 33) to determine with a certain degree of accuracy whether the driving status of the driver is suitable for the traveling on the travel path of the vehicle 1, and for example, may not include information indicating the touching with the steering 46, and may not include information of either the steering angle θst or the torque TQ.

In the present embodiment, the control unit 33 executes the road departure mitigation control when there is a curve in the traveling direction of the vehicle 1 as the state of the travel path in the traveling direction of the vehicle 1, and TTLC as the possibility that the vehicle 1 departs from the travel path is less than a predetermined value, and the driving status of the driver indicated by the driving status information is not suitable for traveling on the travel path of the vehicle 1. In other words, the control unit 33 does not execute the road departure mitigation control when at least one of the three conditions is satisfied, that is, when "there is no curve in the traveling direction of the vehicle", or "TTLC is equal to or greater than a predetermined value", or "the driving status of the driver is suitable for traveling on the travel path of the vehicle 1". Therefore, it is possible to reduce excessive road departure mitigation control.

[Processing Executed by Control Device]

An example of specific processing executed by the control device 30 regarding the road departure mitigation control will be described below. Note that regarding the road departure mitigation control, the control device 30 can set, for example, the following three flags.

1) Curve arrival flag: a flag indicating that the vehicle 1 arrives at or is about to arrive at a curve, which is set to an on state when there is a curve in the traveling direction of the vehicle 1 in the travel path of the vehicle 1.

2) Approaching partition line flag: a flag indicating that the vehicle 1 approaches one of the left or right partition line of the travel path, which is set to an on state when TTLC is less than a predetermined value.

3) Driving status non-matching flag: a flag indicating that the driving status of the driver is not suitable for traveling on the travel path, which is set to an on state when the driving status of the driver is a predetermined content.

<Road Departure Mitigation Control Starting Processing>

First, an example of road departure mitigation control starting processing executed by the control device 30 to start the road departure mitigation control will be described with reference to FIG. 2. For example, when the road departure mitigation control is not executed, the control device 30 repeatedly executes the road departure mitigation control starting processing shown in FIG. 2 at a predetermined cycle.

Figure 2:
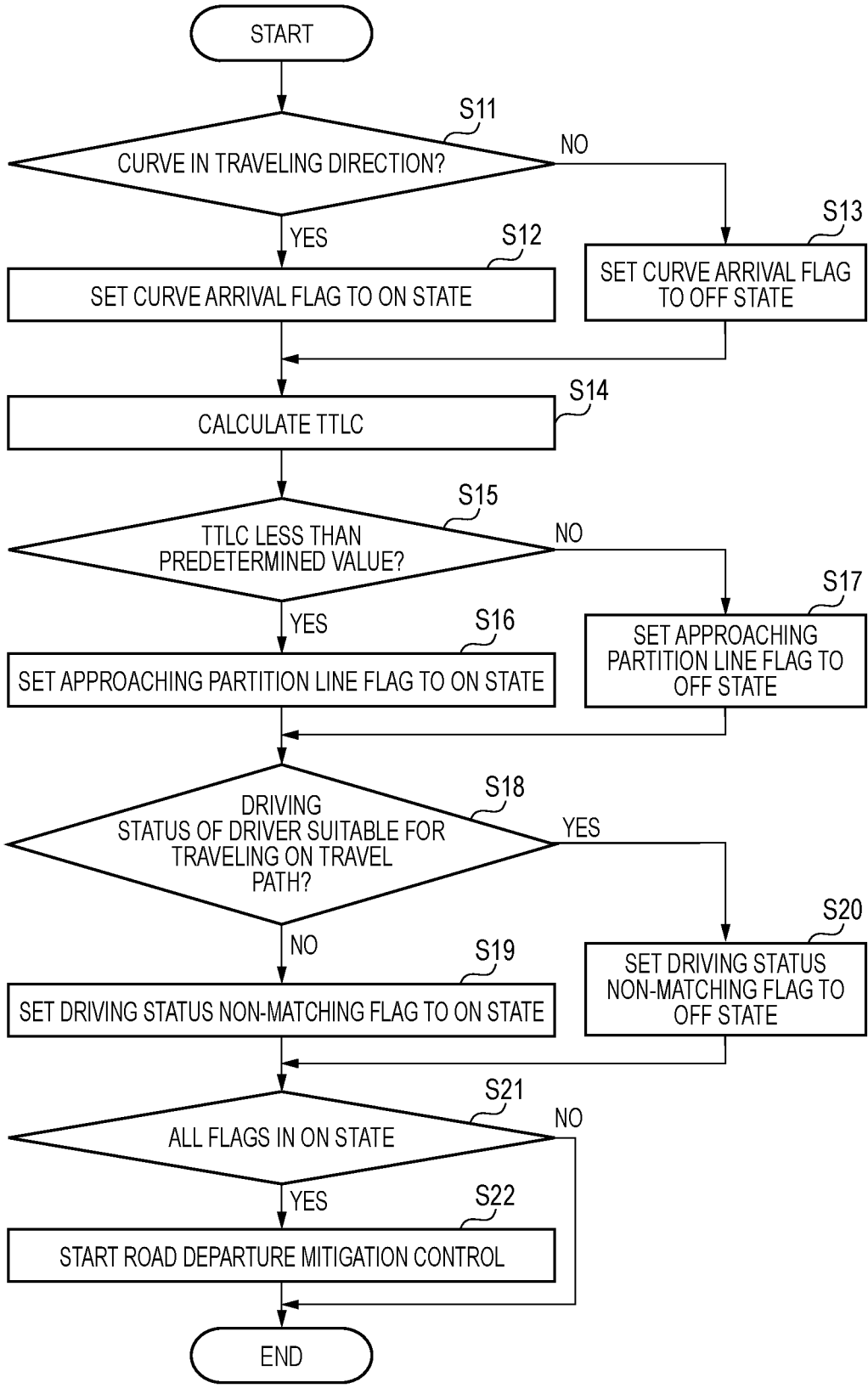
FIG. 2 is a flow chart showing an example of road departure mitigation control starting processing executed by a control device according to the embodiment.

As shown in FIG. 2, in the road departure mitigation control starting processing, the control device 30 first determines whether there is a curve in the traveling direction of the vehicle 1 on the travel path of the vehicle 1 (step S11). Here, the curve is a section whose curvature radius is less than a predetermined value. The predetermined value as a condition for treating a section as a curve can be determined by the manufacturer of the vehicle 1 or the like as appropriate. For example, the control device 30 determines whether there is a curve in the traveling direction of the vehicle 1 based on the partition line recognized by the partition line recognition unit 31. The control device 30 may determine whether there is a curve in the traveling direction of the vehicle 1 based on road information stored in the navigation device 20. In this case, the control device 30 may determine whether there is a curve within a predetermined distance in the traveling direction of the vehicle 1.

If there is a curve in the traveling direction of the vehicle 1 (step S1: Yes), the control device 30 sets the curve arrival flag (step S12) to the on state, and proceeds to processing of a step S14. On the other hand, if there is no curve in the traveling direction of the vehicle 1 (step S1: No), the control device 30 sets the curve arrival flag to an off state (step S13), and proceeds to the processing of the step S14.

Next, the control device 30 calculates TTLC for the partition line recognized by the partition line recognition unit 31 (step S14), and determines whether the calculated TTLC is less than a predetermined value (step S15). If TTLC is less than the predetermined value (step S15: Yes), the control device 30 sets the approaching partition line flag (step S16) to an off state, and proceeds to processing of a step S18. On the other hand, if TTLC is equal to or greater than the predetermined value (step S15: No), the control device 30 sets the approaching partition line flag (step S17) to the on state, and proceeds to the processing of the step S18. Note that the predetermined value serving as a condition for setting the approaching partition line flag to the on state can be determined by the manufacturer of the vehicle 1 or the like as appropriate.

Next, the control device 30 determines whether the driving status of the driver is suitable for traveling on the travel path based on the driving status information acquired from the driving status sensor such as the occupant camera 17 (step S18). Although details will be described later, in the processing of the step S18, for example, the control device 30 determines whether the driving status of the driver is suitable for driving on the travel path by referring to the acquired driving status information and a driving status determination table TL, which will be described later.

If the driving status of the driver is not suitable for traveling on the travel path (step S18: No), the control device 30 sets the driving status non-matching flag to the on state (step S19), and proceeds to processing of a step S21. On the other hand, if the driving status of the driver is suitable for traveling on the travel path (step S18: Yes), the control device 30 sets the driving status non-matching flag to the off state (step S20), and proceeds to the processing of the step S21.

Next, the control device 30 determines whether all of the curve arrival flag, approaching partition line flag, and driving status non-matching flag are set to the on state (step S21). If all the flags are set to the on state (step S21: Yes), the control device 30 starts the road departure mitigation control (step S22), and ends the current road departure mitigation control starting processing. On the other hand, if at least one of the flags is in the off state (step S21: No), the control device 30 directly ends the current road departure mitigation control starting processing.

As described above, the control device 30 starts the road departure mitigation control when all of the curve arrival flag, approaching partition line flag, and driving status non-matching flag are in the on state, that is, when all three conditions that "there is a curve in the traveling direction of the vehicle 1", "TTLC is less than a predetermined value", and "the driving status of the driver is not suitable for traveling on the travel path of the vehicle 1" are satisfied. Therefore, as described above, it is possible to prevent the execution of the road departure mitigation control for the departure from the travel path that is relatively unlikely to lead to accidents, such as departure from the travel path intended by the driver, and execute the road departure mitigation control for the departure that is likely to lead to accidents, such as departure from the travel path on a curve with poor visibility, and it is possible to reduce excessive road departure mitigation control while ensuring the safety of the vehicle 1.

<Road Departure Mitigation Control Ending Processing>

Next, an example of road departure mitigation control ending processing executed by the control device 30 to end the road departure mitigation control will be described with reference to FIG. 3. For example, when the road departure mitigation control is executed, the control device 30 repeatedly executes the road departure mitigation control ending processing shown in FIG. 3 at a predetermined cycle.

Figure 3:
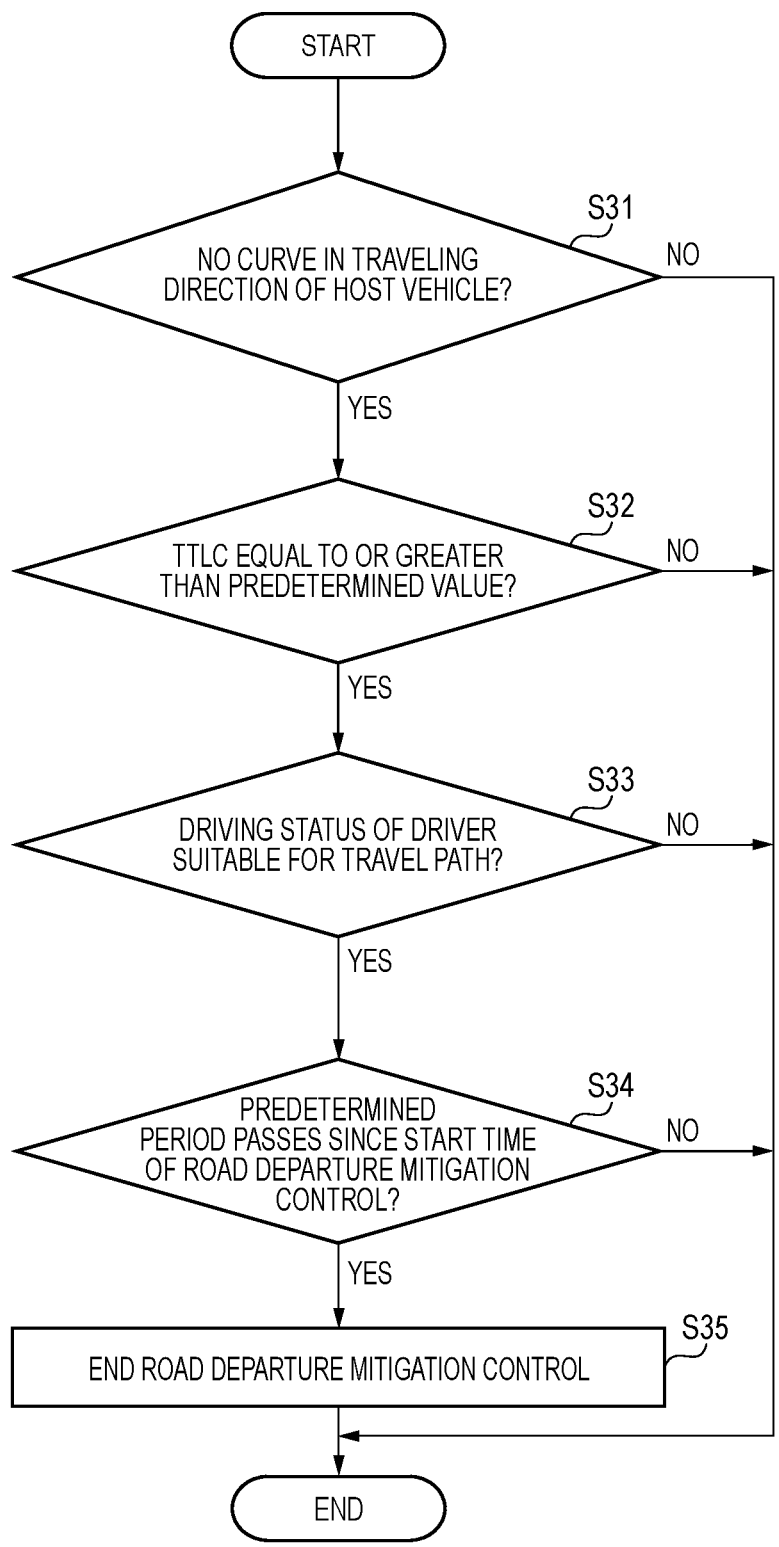
FIG. 3 is a flow chart showing an example of road departure mitigation control ending processing executed by the control device according to the embodiment.

As shown in FIG. 3, in the road departure mitigation control ending processing, the control device 30 first determines whether there is no curve in the traveling direction of the vehicle 1 (step S31). If there is still a curve in the traveling direction of the vehicle 1 (step S31: No), the control device 30 directly ends the current road departure mitigation control ending processing. In this way, when the road departure mitigation control ending processing ends without executing processing of a step S35, which will be described later, the road departure mitigation control is continued.

On the other hand, if there is no curve in the traveling direction of the vehicle 1 (step S31: Yes), the control device 30 calculates TTLC for the partition line recognized by the partition line recognition unit 31, and determines whether the calculated TTLC is equal to or greater than a predetermined value (step S32). The predetermined value used in the processing of the step S32 can be the same as the predetermined value used in the processing of the step S15, but the present invention is not limited thereto. For example, the predetermined value used in the processing of the step S32 may be greater than the predetermined value used in the processing of the step S15.

If TTLC is less than the predetermined value (step S32: No), the control device 30 directly ends the current road departure mitigation control ending processing. On the other hand, if TTLC is equal to or greater than the predetermined value (step S32: Yes), similar to the processing of the step S18, the control device 30 determines whether the driving status of the driver is suitable for traveling on the travel path (step S33).

If the driving status of the driver is not suitable for traveling on the travel path (step S33: No), the control device 30 directly ends the current road departure mitigation control ending processing. On the other hand, if the driving status of the driver is suitable for traveling on the travel path (step S33: Yes), the control device 30 determines whether a predetermined period passes since a start of the currently executed road departure mitigation control (step S34).

If the predetermined period does not pass since the start of the currently executed road departure mitigation control (step S34: No), the control device 30 directly ends the current road departure mitigation control ending processing. On the other hand, if the predetermined period passes since the start of the currently executed road departure mitigation control (step S34: Yes), the control device 30 ends the road departure mitigation control (step S35), and ends the current road departure mitigation control ending processing.

As described above, the control device 30 ends the road departure mitigation control when all of the three conditions are satisfied, that is, when "there is no curve in the traveling direction of the vehicle 1", and "TTLC is equal to or greater than a predetermined value", and "the driving status of the driver is suitable for traveling on the travel path of the vehicle 1". Therefore, when the control device 30 executes the road departure mitigation control, the road departure mitigation control can be continued until the safety of the vehicle 1 can be ensured. Therefore, the safety of the vehicle 1 can be improved.

The control device 30 may end the road departure mitigation control when the above three conditions are satisfied, but here, the road departure mitigation control is ended when a predetermined period passes since the start of the road departure mitigation control. For example, when the road departure mitigation control is executed, notification to the driver by an alarm sound or the like is performed, but if this notification ends in an extremely short time, the driver may not be able to recognize that the notification is due to the road departure mitigation control, which may give the driver a sense of discomfort (for example, an alarm sound is misunderstood as some kind of abnormal sound). In order to avoid such a situation, in the present embodiment, the road departure mitigation control is ended when a predetermined period passes since the start of the road departure mitigation control.

[Driving Status Determination Table]

Next, an example of a driving status determination table used for determining whether the driving status of the driver is suitable for traveling on the travel path will be described with reference to FIG. 4. As shown in FIG. 4, the driving status determination table TL stores information indicating whether to set the driving status non-matching flag to the on state or the off state for each driving status (see symbols TL_a to TL_i in FIG. 4). Note that the driving status determination table TL is stored in advance in a storage device that can be accessed by the control device 30 as appropriate, such as the storage device of the control device 30.

For example, the driving status information acquired when the driver operates the blinker lever (that is, when the blinker is turned on) includes information indicating that the blinker is "operated". Departure off the road accompanied with lighting of the blinker is highly likely to be the departure off the road intended by the driver. Therefore, as shown in FIG. 4, when the driving status information including the information indicating that the blinker is "operated" is acquired as the driving status of the driver, the control device 30 determines that the driving status of the driver is suitable for traveling on the travel path, and sets the driving status non-matching flag to the off state (see symbol TL_a in FIG. 4).

For example, the driving status information acquired when "inattentive driving" is performed includes information indicating that the viewing direction of the driver is out of an allowable range. As the allowable range, a predetermined range can be set based on the traveling direction of the vehicle 1 (which will be described later). Departure off the road when the viewing direction of the driver is "out of an allowable range" is highly likely to be the departure caused by inattentive driving (that is, departure unintended by the driver). Therefore, as shown in FIG. 4, when the driving status information including the information indicating that the viewing direction of the driver is out of the allowable range is acquired as the driving status of the driver, the control device 30 determines that the driving status of the driver is not suitable for traveling on the travel path, and sets the driving status non-matching flag to the on state (see symbols TL_c, TL_e, TL_g, and TL_i in FIG. 4).

For example, the driving status information acquired when the driver does not perform an appropriate operation on the steering 46 to drive the vehicle 1 includes information indicating that the torque TQ applied to the steering 46 is less than a predetermined threshold (for example, approximately zero), or information indicating that the steering angle θst of the steering 46 is less than a predetermined threshold (for example, approximately zero). In other words, when the torque TQ or the steering angle θst is less than the thresholds, there is a high possibility that the driving status of the driver is not suitable for traveling on the travel path. Therefore, as shown in FIG. 4, when the driving status information including the information indicating that the torque TQ or the steering angle θst is less than the threshold (shown as "absence") is acquired as the driving status of the driver, the control device 30 determines that the driving status of the driver is not suitable for traveling on the travel path, and sets the driving status non-matching flag to the on state even when the viewing direction of the driver is in the allowable range (see symbols TL_f and TL_h in FIG. 4).

When the driving status information indicating that no touching with the steering 46 is detected (shown as "absence") is acquired, it is highly probable that the driver does not perform an appropriate operation on the steering 46 to drive the vehicle 1. Therefore, when the driving status information including the information of "absence" of touching with the steering 46 is acquired as the driving status of the driver, the control device 30 may determine that the driving status of the driver is not suitable for traveling on the travel path, and set the driving status non-matching flag to the on state even when the viewing direction of the driver is in the allowable range.

As described above, the control device 30 (for example, the control unit 33) determines that the driving status of the driver is not suitable for traveling on the travel path when the viewing direction is not within an allowable range set based on the traveling direction of the vehicle 1. Therefore, when the driver looks in a direction completely different from the traveling direction of the vehicle 1, that is, performs the inattentive driving, it is possible to execute notification to the driver, and the notification can draw attention of the driver.

The control device 30 (for example, the control unit 33) determines that the driving status of the driver is not suitable for traveling on the travel path there is no operation on the steering 46 as an operation unit that receives an operation for steering the vehicle 1. As a result, when there is a high possibility that the driving status of the driver is not suitable for traveling on the travel path, the notification to the driver can be executed, and the notification can draw attention of the driver.

For example, the control device 30 (for example, the control unit 33) may determine that there is no operation on the steering 46 when the driver is not in touch with the steering 46, or may determine that there is no operation on the steering 46 when an amount of operation to the steering 46 (that is, the steering angle θst) or a force applied to the steering 46 (that is, the torque TQ) is less than the threshold. Therefore, when there is a high possibility that the driving status of the driver is not suitable for traveling on the travel path, the notification to the driver can be executed, and the notification can draw attention of the driver.

Even when the driver is in touch with the steering 46, when the steering angle θst or the torque TQ is less than the threshold, the driver does not operate the steering 46 appropriately, and there is a high possibility that the driving status of the driver is not suitable for traveling on the travel path. Therefore, the control device 30 (for example, the control unit 33) may determine that there is no operation on the steering 46 when the driver is in touch with the steering 46, and the amount of operation to the steering 46 (that is, the steering angle θst) or the force applied to the steering 46 (that is, the torque TQ) is less than the threshold. In this way, when there is a high possibility that the driving status of the driver is not suitable for traveling on the travel path, the notification to the driver can be executed, and the notification can draw attention of the driver.

[Example of Allowable Range]

As described above, the control device 30 may determine that the driving status of the driver is not suitable for traveling on the travel path and set the driving status non-matching flag to the on state, when the viewing direction, which is the direction of the face or visual line of the driver, is outside the allowable range set based on the traveling direction of the vehicle 1 (that is, when the viewing direction is not within the allowable range).

Although the allowable range may always be a constant range, it is desirable to set the allowable range according to the state of the travel path in the traveling direction of the vehicle 1. Therefore, in the present embodiment, the control device 30 sets the allowable range based on the state of the travel path in the traveling direction of the vehicle 1. For example, information that defines the allowable range that should be set according to the state of the travel path is stored in advance in a storage device that can be accessed by the control device 30 as appropriate, such as the storage device of the control device 30, as will be described later with reference to FIGS. 5A to 5C. The control device 30 sets the allowable range according to the state of the travel path in the traveling direction of the vehicle 1 by referring to this information and the state of the travel path in the traveling direction of the vehicle 1 specified from the partition lines recognized by the partition line recognition unit 31 or the road information stored in the navigation device 20.

Figure 5:
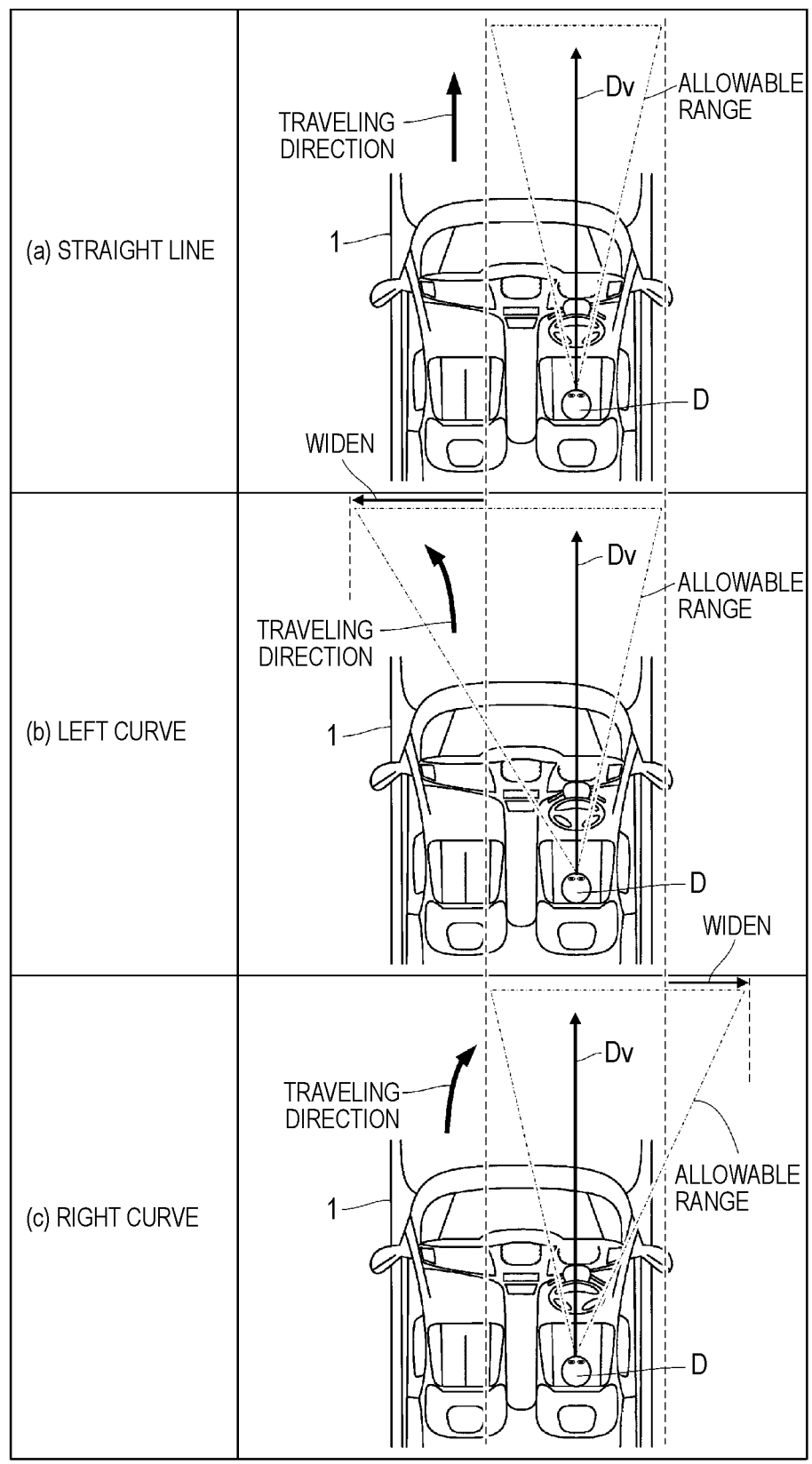
FIG. 5 is diagrams showing examples of an allowable range.

Part (a) of FIG. 5 shows an example of the allowable range when there is no curve in the traveling direction of the vehicle 1. Part (b) of FIG. 5 shows an example of the allowable range when there is a left curve in the traveling direction of the vehicle 1. Part (c) of FIG. 5 shows an example of the allowable range when there is a right curve in the traveling direction of the vehicle 1. Note that in FIG. 5, D indicates the driver, and an arrow Dv indicates an example of the viewing direction.

As shown in FIG. 5, the allowable range when there is a curve in the traveling direction of the vehicle 1 is wider than the allowable range when there is no curve in the traveling direction of the vehicle 1 on one side where the curve exists in the left-right direction of the vehicle 1 (a left side for the left curve, a right side for the right curve). Therefore, when there is a curve in the traveling direction of the vehicle 1, it is possible to widen the allowable range to one side of the vehicle 1 in the left-right direction where the curve exists, and it is possible to set an appropriate allowable range according to the state of the travel path in the traveling direction of the vehicle 1.

[Other Examples of Allowable Range]

Figure 6:
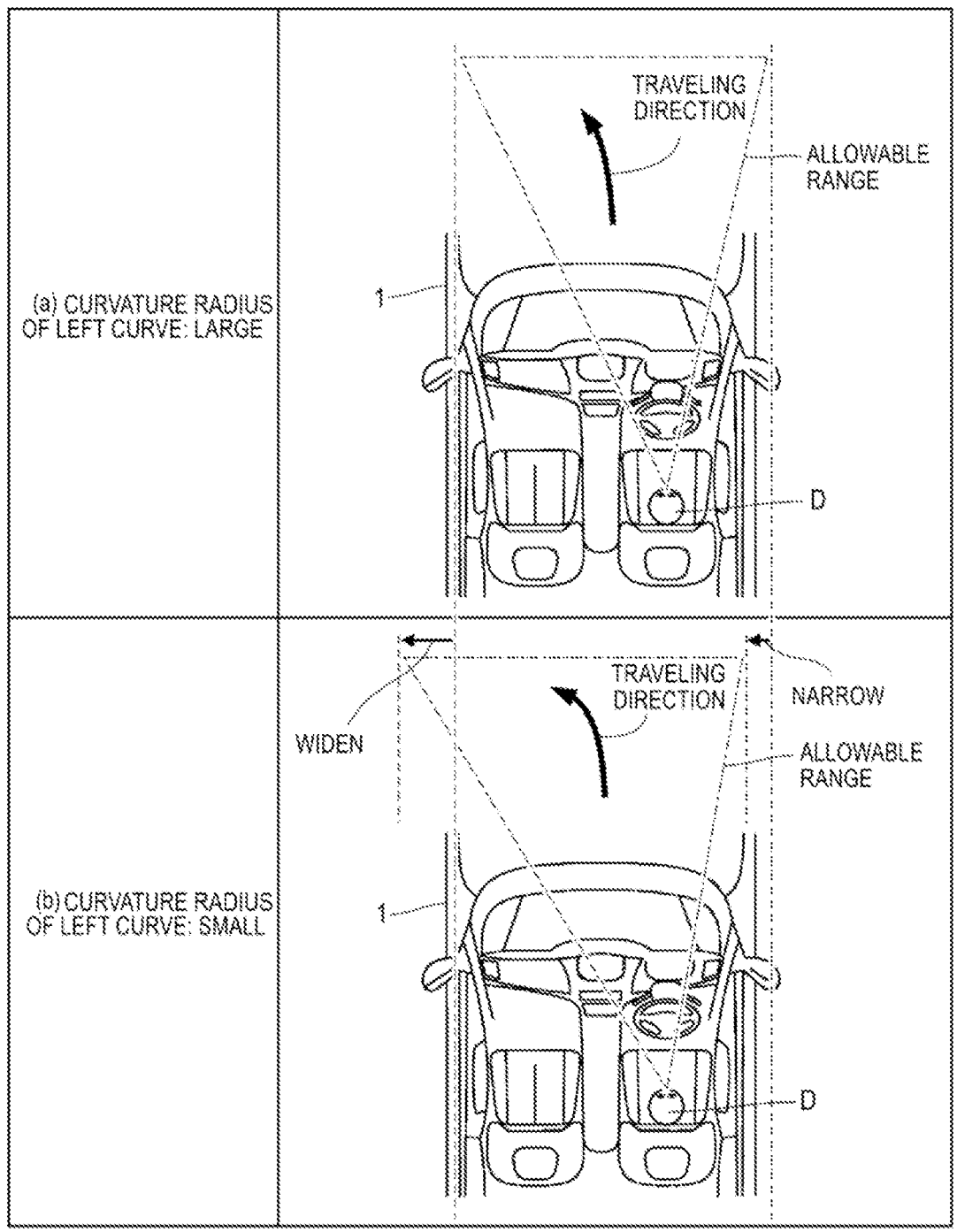
FIG. 6 is diagrams showing other examples of the allowable range.

The allowable range when there is a curve in the traveling direction of the vehicle 1 may vary according to the curvature radius of the curve. Part (a) of FIG. 6 shows an example of the allowable range when there is a left curve with a curvature radius of a predetermined value (hereinafter also referred to as "first predetermined value") in the traveling direction of the vehicle 1. Part (b) of FIG. 6 shows an example of the allowable range when there is a left curve with a curvature radius of a second predetermined value smaller than the first predetermined value in the traveling direction of the vehicle 1.

As shown in FIG. 6, when there is a curve in the traveling direction of the vehicle 1, the allowable range when the curvature radius of the curve is small (that is, a sharp curve) is wider on one side where the curve exists in the left-right direction and narrower on the opposite side than the allowable range when the curvature radius of the curve is large (that is, a gentle curve). Therefore, when there is a curve in the traveling direction of the vehicle 1, it is possible to set the allowable range considering the curvature radius of the curve, and it is possible to set an appropriate allowable range according to the state of the travel path in the traveling direction of the vehicle 1.

When the vehicle 1 travels on the curve, the control device 30 may dynamically change the allowable range as the vehicle 1 travels, such as gradually widening the allowable range in a direction of the curve (to the inside of the curve) as the vehicle 1 travels.

[Specific Control Example by Control Device]

Figure 7:
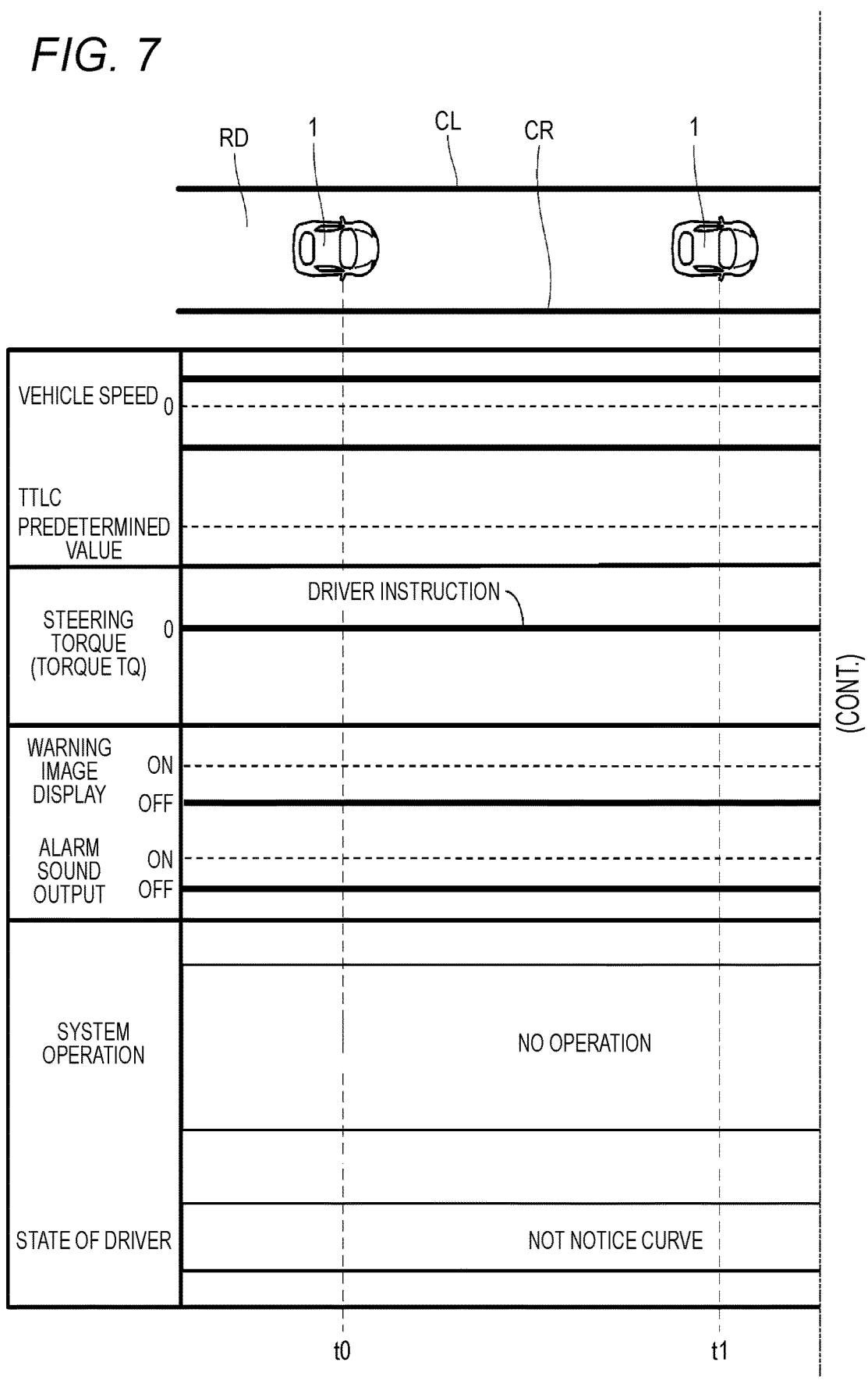
FIG. 7 is a diagram showing an example of state changes of a vehicle 1 and a driver over time.

Next, a specific control example by the control device 30 will be described with reference to FIG. 7. In FIG. 7, the vehicle 1 travels on a travel path RD whose left and right sides are marked off by a left side partition line CL and a right side partition line CR, respectively. The travel path RD includes a linear section and a left curve. Here, an example in which the vehicle 1 travels in the linear section of the travel path RD and then enters the left curve will be described.

During a period from a time t0 to a time t2 shown in FIG. 7, the vehicle 1 travels in the linear section of the travel path RD at constant vehicle speed V and torque TQ (shown as "steering torque"). At this time, although the driver does not notice the left curve ahead of the linear section, TTLCs of the vehicle 1 with respect to the left side partition line CL and the right side partition line CR are both equal to or greater than a predetermined value, and therefore the control device 30 does not execute the road departure mitigation control (shown as "none" in system operation). That is, at this time, both the display of the warning image and the output of the alarm sound by the road departure mitigation control are turned off. However, from a time ta (t1<ta<t2), the vehicle 1 begins to approach the partition line of the travel path RD (here, the right side partition line CR), and accordingly TTLC (more specifically, TTLC with respect to the right side partition line CR) also begins to decrease.

At a time 3 after the time t2, the vehicle 1 enters the left curve of the travel path RD, but the driver drives inattentively and does not notice that the vehicle 1 enters the curve. Therefore, the driver does not operate the steering 46 to turn in the curve, and the torque TQ remains "0". In such a case, the control device 30 determines that the driving status of the driver is not suitable for traveling on the travel path based on the driving status information acquired from the driving status sensors such as the occupant camera 17 and the torque sensor 42. Since the driver does not perform any appropriate operation to turn in the curve, TTLC further decreases and reaches a predetermined value, which is a condition for executing the road departure mitigation control, at the time t3.

In such a case, the control device 30 executes the road departure mitigation control from the time t3. Specifically, the control device 30 instructs the EPSECU 45 of the EPS system 40 to apply a predetermined driving force to the steering column 47 as the steering assist control. Upon receiving this instruction, the EPSECU 45 drives the EPS motor 43 to apply the driving force to the steering column 47. As a result, a torque according to the system instruction is added to the torque TQ (steering torque).

The control device 30 causes the touch panel 21 to display the warning image and causes the speaker 22 to output the alarm sound as the notification control. That is, the display of the warning image and the output of the alarm sound are turned on. As a result, the driver can be notified that the road departure mitigation control is activated. Note that as described above, the warning image may be displayed on another display device such as a multi-information display instead of the touch panel 21.

The driver who notices the activation of the road departure mitigation control then notices that the vehicle 1 enters the left curve at a time tb (t3<tb<t4). Then, at a time t4, the driver who notices that the vehicle 1 enters the left curve starts steering with the steering 46, and accordingly, the vehicle 1 gradually returns to an approximate center of the travel path RD. As a result, the driving status of the driver is suitable for traveling on the travel path RD, and TTLC is equal to or greater than the predetermined value, and therefore, the control device 30 ends the road departure mitigation control as the vehicle 1 passes the curve.

As described above, the control device 30 (for example, the control unit 33) executes notification to the driver when there is a curve in the traveling direction of the vehicle 1, and there is a high possibility that the vehicle 1 departs from the travel path, and the driving status of the driver is not suitable for traveling on the travel path. As a result, while reducing excessive notifications that may annoy the driver, notifications important for the driver can be executed, and the safety of the vehicle 1 can be improved.

The control device 30 (for example, the control unit 33) further executes the steering assist control for mitigating departure of the vehicle 1 from the travel path when there is a curve in the traveling direction of the vehicle 1, and there is a high possibility that the vehicle 1 departs from the travel path, and the driving status of the driver is not suitable for traveling on the travel path. Therefore, the safety of the vehicle 1 can be further improved.

Note that in the example described with reference to FIG. 7, the notification control and the steering assist control by the road departure mitigation control are started at the same time, but the present invention is not limited thereto. For example, when there is a curve in the traveling direction of the vehicle 1, and there is a high possibility that the vehicle 1 departs from the travel path, and the driving status of the driver is not suitable for traveling on the travel path, the control device 30 first executes notification to the driver (that is, the notification control), and then may execute the steering assist control when the possibility of the vehicle 1 departing from the travel path further increases after the notification (for example, when TTLC further decreases). In this way, the driver can be prevented from excessively relying on the steering assist control by notifying the driver first and then prompting the driver to perform a voluntary operation. On the other hand, when the possibility of the vehicle 1 departing from the travel path further increases, the steering assist control is executed to mitigating the vehicle 1 from departing from the travel path, thereby improving the safety of the vehicle 1.

[Another Example of Driving Status Determination Table]

Figure 8:
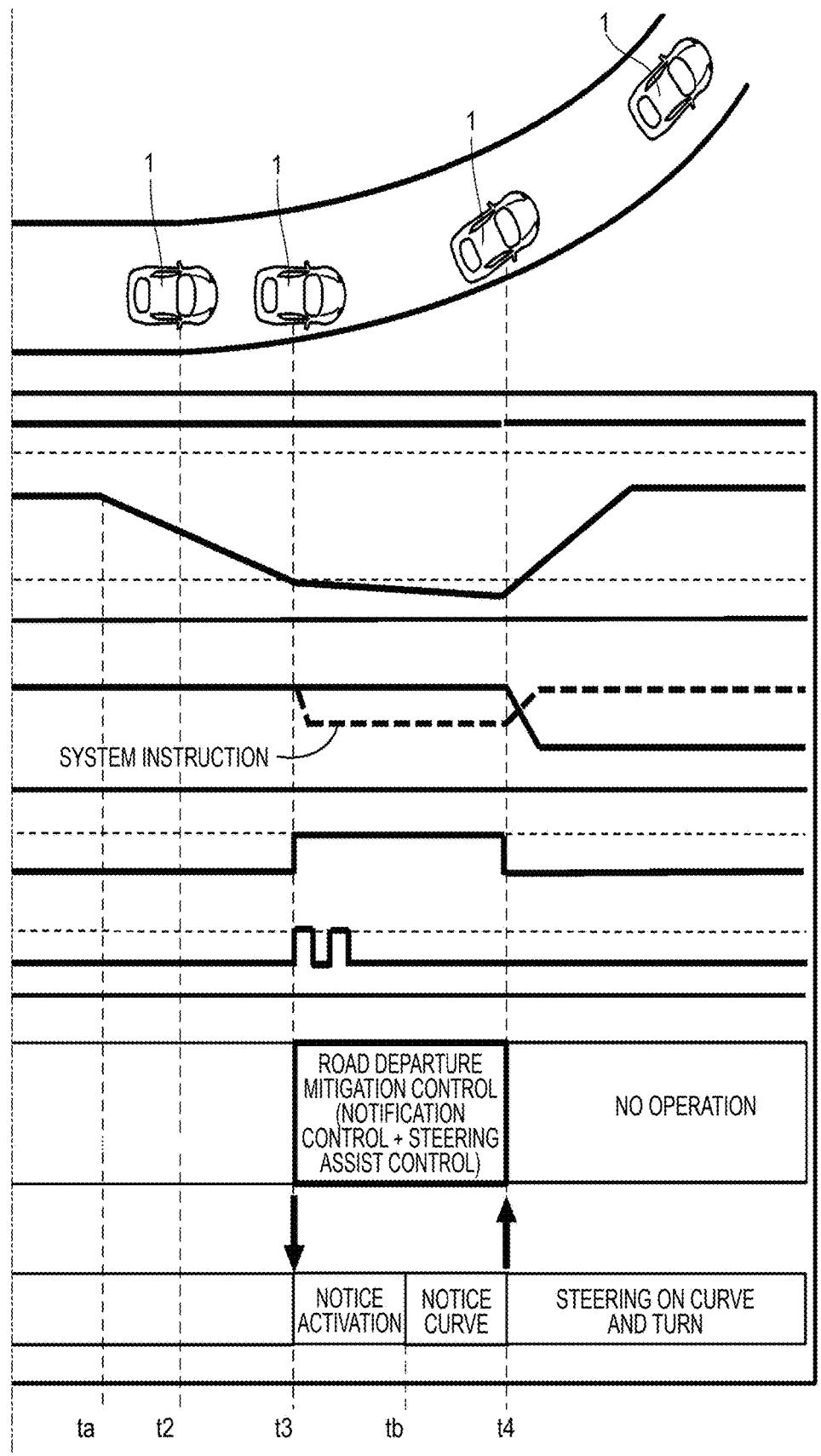
FIG. 8 is a diagram showing another example of the driving status determination table.

Next, another example of the driving status determination table TL will be described with reference to FIG. 8. For example, even when the viewing direction of the driver is out of the allowable range, it is also possible that the driver makes an appropriate operation on the steering 46 to drive the vehicle 1 when the torque TQ and the steering angle θst are equal to or greater than the thresholds. Therefore, as shown in FIG. 8, when the driving status information including the information indicating that the torque TQ and the steering angle θst are equal to or greater than the thresholds (shown as "presence") is acquired as the driving status of the driver, the control device 30 determines that the driving status of the driver is suitable for traveling on the travel path, and sets the driving status non-matching flag to the off state even when the viewing direction of the driver is out of the allowable range (see symbols TL_c and TL_e in FIG. 8). Note that the driving status information including the information indicating the "absence" of touching with the steering 46 and that the torque TQ and the steering angle θst are equal to or greater than the thresholds can be acquired when, for example, the driver drives the vehicle 1 wearing gloves.

When the viewing direction of the driver is within the allowable range, the driver is likely to notice that the vehicle 1 is about to depart from the path without executing the road departure mitigation control (notification control). Therefore, as shown in FIG. 8, when the driving status information including the information indicating that the viewing direction of the driver is within the allowable range is acquired as the driving status of the driver, the control device 30 may determine that the driving status of the driver is suitable for traveling on the travel path, and set the driving status non-matching flag to the off state even when the touching with the steering 46 is shown as "absence", or the torque TQ and the steering angle θst are less than the thresholds (see a symbol TL_h in FIG. 8).

According to the driving status determination table TL shown in FIG. 8, it is possible to further reduce excessive road departure mitigation control than using the driving status determination table TL shown in FIG. 4.

[Other Processing Executed by Control Device 30]

When an execution frequency of the road departure mitigation control is high, the driver may be dependent on the road departure mitigation control, and a consciousness of the driver to drive the vehicle 1 appropriately may decrease. In order to warning such a driver, the control device 30 may perform processing shown in FIG. 9 at a predetermined circle when, for example, an ignition power of the vehicle 1 is turned on.

Figure 9:
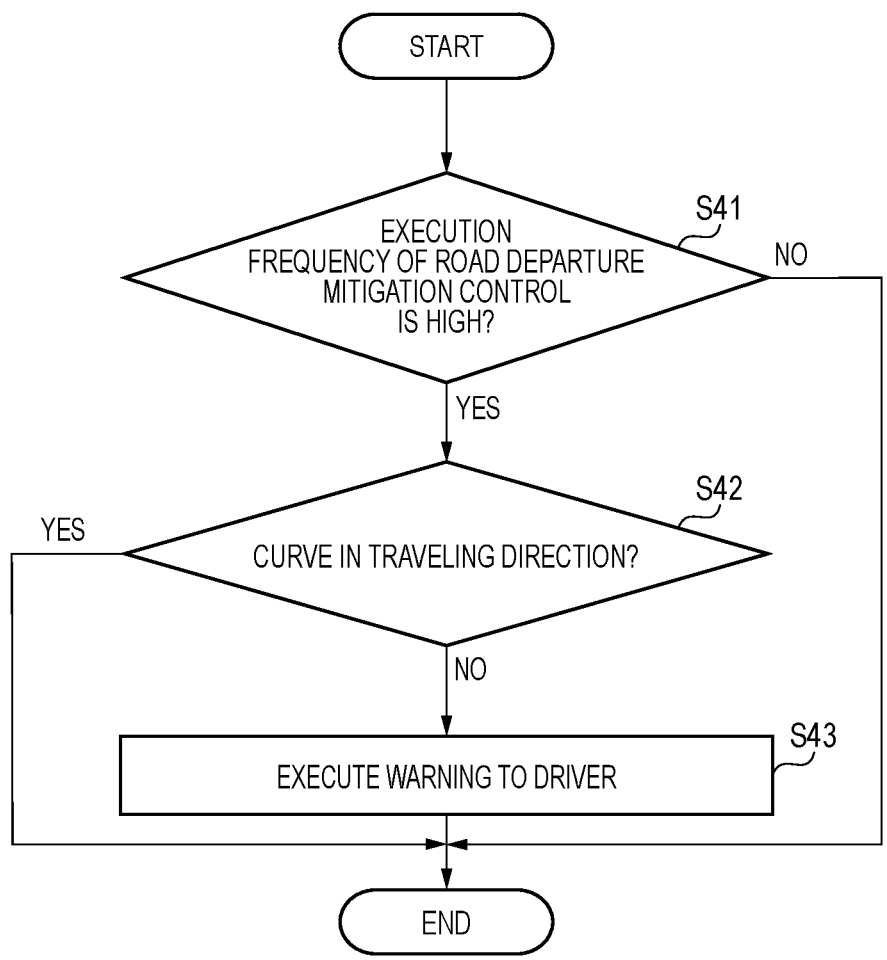
FIG. 9 is a flow chart showing an example of another processing executed by the control device of the embodiment.

As shown in FIG. 9, the control device 30 first determines whether the execution frequency of the road departure mitigation control is higher than a predetermined threshold (step S41). The execution frequency is, for example, the number of times the road departure mitigation control is executed per unit time. For example, the control device 30 stores, in the storage device of the control device 30 or the like, execution history information of the road departure mitigation control, in which a time when the road departure mitigation control is executed and information indicating that the road departure mitigation control is executed are associated with each other. In this way, the control device 30 can obtain the execution frequency of the road departure mitigation control by referring to the execution history information of the road departure mitigation control stored in the storage device of the control device 30 or the like.

If the execution frequency of the road departure mitigation control is low (step S41: No), the control device 30 directly ends the series of processing shown in FIG. 9. On the other hand, if the execution frequency of the road departure mitigation control is high (step S41: Yes), the control device 30 determines whether there is a curve in the traveling direction of the vehicle 1 (step S42) as the processing in the step S11. If there is a curve in the traveling direction of the vehicle 1 (step S42: Yes), the control device 30 directly ends the series of processing shown in FIG. 9.

On the other hand, if there is no curve in the traveling direction of the vehicle 1 (step S42: No), the control device 30 executes predetermined warning to the driver (step S43), and ends the series of processing shown in FIG. 9. The warning executed by the processing in the step S43 is notification different from the notification executed by the notification control of the road departure mitigation control, and is performed by, for example, displaying a message such as "Driving consciousness is decreasing. Please try to drive appropriately" on a display device such as the touch panel 21, or by outputting the message from the speaker 22.

As described above, when the execution frequency of the road departure mitigation control is high, the control device 30 executes the predetermined warning to the driver when there is no curve in the traveling direction of the vehicle 1. As a result, when there is a possibility that the consciousness of the driver to drive appropriately decrease, the driver may be prompted to perform appropriate driving at an appropriate timing when steering operation is not relatively busy.

Note that in the example shown in FIG. 9, the warning to the driver is executed based on the execution frequency, but the present invention is not limited thereto. For example, in place of the execution frequency, the control device 30 may execute the warning when the road departure mitigation control is continuously executed on two curves (that is, when the number of times of continuous operation exceeds a threshold).

Although an embodiment of the present invention has been described above with reference to the drawings, it is needless to say that the present invention is not limited to the above-described embodiment. It will be apparent to those skilled in the art that various changes and modifications may be conceived within the scope of claims. It is also understood that the various changes and modifications belong to the technical scope of the present invention. In addition, the respective constituent elements in the above embodiment may be combined as desired without departing from the gist of the invention.

For example, in the above-described embodiment, TTLC is used as an index indicating the possibility that the vehicle 1 departs from the travel path, but the present invention is not limited thereto. For example, instead of TTLC, a distance between the vehicle 1 and the partition line may be used as the index indicating the possibility that the vehicle 1 departs from the travel path. For example, the control device 30 may machine-learn scenes in which the vehicle 1 departs from the travel path, and use learning results to estimate the possibility that the vehicle 1 departs from the travel path.

At least the following matters are described in the present description. Note that although corresponding constituent elements and the like in the above embodiment are shown in parentheses, the present invention is not limited thereto.

(1) A control device (control device 30) for controlling a host vehicle (vehicle 1), the host vehicle (vehicle 1) including an external sensor (sensor group 10) configured to acquire surrounding information of a host vehicle (vehicle 1), a driving status sensor (operation detection unit 16, occupant camera 17, steering angle sensor 41, torque sensor 42, steering touch sensor 48) configured to acquire driving status information indicating a driving status of a driver of the host vehicle, and a notification device (touch panel 21, speaker 22) capable of executing notification to the driver, the control device including:

a partition line recognition unit (partition line recognition unit 31) configured to recognize partition lines (left side partition line CL, right side partition line CR) based on the surrounding information acquired by the external sensor, the partition lines marking off left and right sides of a travel path (travel path RD) on which the host vehicle travels, a departure prediction unit (departure prediction unit 32) configured to estimate a possibility (TTLC) of the host vehicle to depart from the travel path based on a position and a posture of the host vehicle with respect to the partition lines recognized by the partition line recognition unit; and a control unit (control unit 33) configured to control the notification by the notification device, based on the possibility of departing from the travel path estimated by the departure prediction unit, the driving status information acquired by the driving status sensor, and a state of the travel path in a traveling direction of the host vehicle, in which the control unit executes the notification when there is a curve with a curvature radius less than a predetermined value in the traveling direction, and there is a high possibility of departing from the travel path, and the driving status of the driver is not suitable for traveling on the travel path.

According to (1), while reducing excessive notifications that may annoy the driver, notifications important for the driver can be executed, and the safety of the host vehicle can be improved.

(2) The control device according to (1), in which
the driving status of the driver includes a viewing direction that is a direction of face or eyes of the driver, and
the control unit determines that the driving status of the driver is not suitable for traveling on the travel path when the viewing direction is not within an allowable range set based on the traveling direction.

According to (2), when the driver looks in a direction completely different from the traveling direction of the host vehicle, that is, performs the "inattentive driving", it is possible to execute notification to the driver, and the notification can draw attention of the driver.

(3) The control device according to (2), in which
the allowable range is set further based on the state of the travel path in the traveling direction, and
a first allowable range is wider on one side in a left-right direction of the host vehicle than a second allowable range, the first allowable range being the allowable range of the travel path with the curve, the second allowable range being the allowable range of the travel path with no curve, and the one side being a side toward which the travel path curves.

According to (3), when there is a curve in the traveling direction of the host vehicle, it is possible to widen the allowable range to one side in the left-right direction toward which the travel path curves, and therefore, it is possible to set an appropriate allowable range according to the state of the travel path in the traveling direction of the host vehicle.

(4) The control device according to (3), in which
the first allowable range of the travel path with a small curvature radius of the curve is wider on the one side than the first allowable range of the travel path with a large curvature radius of the curve.

According to (4), it is possible to widen the allowable range to one side toward which the travel path curves according to the curvature radius of the curve in the traveling direction of the host vehicle, and therefore, it is possible to set an appropriate allowable range according to the state of the travel path in the traveling direction of the host vehicle.

(5) The control device according to (3) or (4), in which
the first allowable range of the travel path with small curvature radius of the curve is narrower on another side opposite to the one side in the left-right direction than the first allowable range of the travel path with a large curvature radius of the curve.

According to (5), it is possible to narrow the allowable range to the another side opposite to the one side toward which the travel path curves according to the curvature radius of the curve in the traveling direction of the host vehicle, and therefore, it is possible to set an appropriate allowable range according to the state of the travel path in the traveling direction of the host vehicle.

(6) The control device according to any one of (1) to (5), in which
the driving status of the driver includes an operation state with respect to an operation unit that receives operation of steering the vehicle, and
the control unit determines that the driving status of the driver is not suitable for traveling on the travel path when there is no operation on the operation unit.

There is a high possibility that the driving status of the driver is not suitable for traveling on the travel path when there is no operation on the operation unit that receives the operation of steering the host vehicle. According to (6), when there is a high possibility that the driving status of the driver is not suitable for traveling on the travel path, the notification to the driver can be executed, and the notification can draw attention of the driver.

(7) The control device according to (6), in which
the control unit determines that there is no operation on the operation unit when the driver is not in touch with the operation unit.

If the driver is not in touch with the operation unit, the driver does not operate the operation unit, and there is a high possibility that the driving status of the driver is not suitable for traveling on the travel path. According to (7), when there is a high possibility that the driving status of the driver is not suitable for traveling on the travel path, the notification to the driver can be executed, and the notification can draw attention of the driver.

(8) The control device according to (6) or (7), in which
the control unit determines that there is no operation on the operation unit when an amount of operation on the operation unit or a force applied to the operation unit is less than a threshold.

When the amount of operation on the operation unit or the force applied to the operation unit is less than the threshold, the driver does not appropriately operate the operation unit, and there is a high possibility that the driving status of the driver is not suitable for traveling on the travel path. According to (8), when there is a high possibility that the driving status of the driver is not suitable for traveling on the travel path, the notification to the driver can be executed, and the notification can draw attention of the driver.

(9) The control device according to (8), in which
the control unit determines that there is no operation on the operation unit when the driver is in touch with the operation unit and the amount of operation or the force applied to the operation unit is less than the threshold.

Even if the driver is in touch with the operation unit, when the amount of operation on the operation unit or the force applied to the operation unit is less than the threshold, the driver does not appropriately operate the operation unit, and there is a high possibility that the driving status of the driver is not suitable for traveling on the travel path. According to (9), when there is a high possibility that the driving status of the driver is not suitable for traveling on the travel path, the notification to the driver can be executed, and the notification can draw attention of the driver.

(10) The control device according to any one of (1) to (9), in which
the control unit further executes steering assist control for mitigating departure from the travel path of the host vehicle when the curve exists in the traveling direction, and there is a high possibility of departing from the travel path, and the driving status of the driver is not suitable for traveling on the travel path.

According to (10), the safety of the host vehicle can be further improved.

(11) The control device according to (10), in which
the notification device is capable of executing a first notification and a second notification as the notification to the driver, the second notification being different from the first notification, and
the control unit causes the notification device to execute the second notification when the curve does not exist in the traveling direction, according to an execution history of at least one of the first notification and the steering assist control.

According to (11), when there is a possibility that the consciousness of the driver to drive appropriately decrease, the driver may be prompted to perform appropriate driving at an appropriate timing when steering operation is not relatively busy.

What is claimed is:

1. A control device for controlling a host vehicle, the host vehicle including an external sensor configured to acquire surrounding information of a host vehicle, a driving status sensor configured to acquire driving status information indicating a driving status of a driver of the host vehicle, and a notification device capable of executing notification to the driver, the control device comprising processing circuitry configured to:
   recognize partition lines based on the surrounding information acquired by the external sensor, the partition lines marking off left and right sides of a travel path on which the host vehicle travels;
   estimate a possibility of the host vehicle to depart from the travel path based on a position and a posture of the host vehicle with respect to the recognized partition lines; and
   control the notification by the notification device based on the estimated possibility of departing from the travel path, the driving status information acquired by the driving status sensor, and a state of the travel path in a traveling direction of the host vehicle, wherein the processing circuitry executes the notification when there is a curve with a curvature radius less than a predetermined value in the traveling direction, and there is a high possibility of departing from the travel path, and the driving status of the driver is not suitable for traveling on the travel path,
the driving status of the driver includes a viewing direction that is a direction of face or eyes of the driver,
the processing circuitry determines that the driving status of the driver is not suitable for traveling on the travel path when the viewing direction is not within an allowable range set based on the traveling direction,
the allowable range is set further based on the state of the travel path in the traveling direction, and
a first allowable range is wider on one side in a left-right direction of the host vehicle than a second allowable range, the first allowable range being the allowable range of the travel path with the curve, the second allowable range being the allowable range of the travel path with no curve, and the one side being a side toward which the travel path curves.

2. The control device according to claim 1, wherein the first allowable range of the travel path with a small curvature radius of the curve is wider on the one side than the first allowable range of the travel path with a large curvature radius of the curve.

3. The control device according to claim 1, wherein
the first allowable range of the travel path with a small curvature radius of the curve is narrower on another side opposite to the one side in the left-right direction than the first allowable range of the travel path with a large curvature radius of the curve.

4. The control device according to claim 1, wherein
the driving status of the driver includes an operation state with respect to an operation unit that receives operation of steering the host vehicle, and
the processing circuitry determines that the driving status of the driver is not suitable for traveling on the travel path when there is no operation on the operation unit.

5. The control device according to claim 4, wherein
the processing circuitry determines that there is no operation on the operation unit when the driver is not in touch with the operation unit.

6. The control device according to claim 4, wherein
the processing circuitry determines that there is no operation on the operation unit when an amount of operation on the operation unit or a force applied to the operation unit is less than a threshold.

7. The control device according to claim 6, wherein
the processing circuitry determines that there is no operation on the operation unit when the driver is in touch with the operation unit and the amount of operation or the force applied to the operation unit is less than the threshold.

8. The control device according to claim 1, wherein
the processing circuitry further executes steering assist control for mitigating departure from the travel path of the host vehicle when the curve exists in the traveling direction, and there is a high possibility of departing from the travel path, and the driving status of the driver is not suitable for traveling on the travel path.

9. The control device according to claim 8, wherein
the notification device is capable of executing a first notification and a second notification as the notification to the driver, the second notification being different from the first notification, and the processing circuitry causes the notification device to execute the second notification when the curve does not exist in the traveling direction, according to an execution history of at least one of the first notification and the steering assist control.

\* \* \* \* \*